United States Patent
Schubert et al.

(10) Patent No.: US 12,017,154 B2
(45) Date of Patent: Jun. 25, 2024

(54) METHOD FOR DETERMINING IMPURITIES IN POLYALKYLENE ETHERS OR POLYALKYLENE AMINES AND USE THEREOF

(71) Applicant: Friedrich-Schiller-Universitaet Jena (FSU), Jena (DE)

(72) Inventors: Ulrich Sigmar Schubert, Jena (DE); Ivo Nischang, Jena (DE); Michaela Brunzel, Jena (DE)

(73) Assignee: FRIEDRICH-SCHILLER-UNIVERSITAET JENA, Jena (DE)

( * ) Notice: Subject to any disclaimer, the term of this patent is extended or adjusted under 35 U.S.C. 154(b) by 641 days.

(21) Appl. No.: 16/964,389

(22) PCT Filed: Jan. 25, 2019

(86) PCT No.: PCT/EP2019/000023
§ 371 (c)(1),
(2) Date: Jul. 23, 2020

(87) PCT Pub. No.: WO2019/145117
PCT Pub. Date: Aug. 1, 2019

(65) Prior Publication Data
US 2020/0348271 A1    Nov. 5, 2020

(30) Foreign Application Priority Data
Jan. 27, 2018   (DE) .................. 102018000650.7

(51) Int. Cl.
*B01D 15/32*    (2006.01)
*B01J 20/283*   (2006.01)
(Continued)

(52) U.S. Cl.
CPC .......... *B01D 15/325* (2013.01); *B01J 20/283* (2013.01); *G01N 30/74* (2013.01);
(Continued)

(58) Field of Classification Search
CPC .. G01N 30/482; G01N 30/74; G01N 30/8631; G01N 2030/027;
(Continued)

(56) References Cited

U.S. PATENT DOCUMENTS

| | | | |
|---|---|---|---|
| 6,455,639 | B1 | 9/2002 | Yasukohchi et al. |
| 9,017,557 | B2 | 4/2015 | Erbacher |

(Continued)

FOREIGN PATENT DOCUMENTS

| | | | |
|---|---|---|---|
| DE | 19726151 A1 | 12/1998 | |
| DE | 19726164 A1 | 12/1998 | |

(Continued)

OTHER PUBLICATIONS

Baumgaertel, Anja, et al. "Characterization of poly (2-oxazoline) homo-and copolymers by liquid chromatography at critical conditions." Journal of Chromatography A 1218.46 (2011): 8370-8378. (Year: 2011).*

(Continued)

*Primary Examiner* — Jill A Warden
*Assistant Examiner* — Michael Paul Shimek
(74) *Attorney, Agent, or Firm* — Abel Schillinger, LLP

(57) ABSTRACT

Disclosed is a method for the determination of impurities in polyalkylene ethers and polyalkylene amines comprising the steps
i) introducing polyalkylene ethers or polyalkylene amines as an analyte into a chromatography column containing monolithic silica gel as a stationary phase,
ii) eluting the analyte with a liquid elution agent having such a polarity that the analyte is in adsorptive equilibrium with the stationary phase during chromatography,
iii) detecting the components of the analyte at the exit-side end of the chromatography column, receiving a
(Continued)

chromatogram, which shows different components of the analyte and its qualitative amount depending on the elution time of the individual components, and iv) identifying bands in the chromatogram having a low height or area compared to the band with the largest height or area as an indication of the presence of impurities in the analyte.

The method allows in an easy manner to identify impurities in the sample. The method can be used for quality control but also for the preparative cleaning of the sample.

17 Claims, 9 Drawing Sheets

(51) Int. Cl.
  *B01J 20/291* (2006.01)
  *G01N 30/02* (2006.01)
  *G01N 30/74* (2006.01)
  *G01N 30/86* (2006.01)
  *G01N 30/88* (2006.01)

(52) U.S. Cl.
  CPC ......... *G01N 30/8631* (2013.01); *B01J 20/291* (2013.01); *G01N 2030/027* (2013.01); *G01N 2030/8872* (2013.01)

(58) Field of Classification Search
  CPC ......... G01N 2030/8872; G01N 30/8689; B01J 20/291; B01D 15/325
  See application file for complete search history.

(56) References Cited

U.S. PATENT DOCUMENTS

| | | | |
|---|---|---|---|
| 2004/0197933 A1 | 10/2004 | Venkataraman | |
| 2008/0315083 A1 | 12/2008 | Lubda | |
| 2010/0292515 A1 | 11/2010 | Yamamoto | |
| 2015/0080538 A1* | 3/2015 | Bentley | A61K 9/1272 528/403 |

FOREIGN PATENT DOCUMENTS

| | | | |
|---|---|---|---|
| DE | 19801575 A1 | 7/1999 | |
| EP | 1308723 A2 * | 5/2003 | ............ B01D 15/08 |
| EP | 1629887 A1 | 3/2006 | |
| WO | 2005075976 A1 | 8/2005 | |
| WO | 2006013043 A1 | 2/2006 | |
| WO | 2006096535 A1 | 9/2006 | |

OTHER PUBLICATIONS

Cabrera, Karin. "Applications of silica-based monolithic HPLC columns." Journal of separation science 27.10-11 (2004): 843-852. (Year: 2004).*

Trathnigg, Bernd, and Hasnat Ahmed. "Separation of all oligomers in polyethylene glycols and their monomethyl ethers by one-dimensional liquid chromatography." Analytical and bioanalytical chemistry 399 (2011): 1535-1545. (Year: 2011).*

Barman B N et al. "Identification and quantification of polyethylene glycol types in polyethylene glycol methyl ether and polyethylene glycol vinyl ether", Journal of Chromatography A, Elsevier, Amsterdam, NL, vol. 1216, No. 40, Oct. 2, 2009 (Oct. 2, 2009), pp. 6816-6823 [retrieved on Aug. 14, 2009].

Lee D et al. "Identification and quantification of trace impurities in fatty alcohol ethoxylates using HPLC and MALDI-TOF mass spectrometry" Analytica Chimica Acta, Elsevier, Amsterdam, NL, vol. 654, No. 1, Nov. 3, 2009 (Nov. 3, 2009), pp. 59-63 [ retrieved on May 3, 2009].

Liya Tang et al. "Separation and detection of bis-maleimide-polyethylene glycol and mono-maleimide-polyethylene glycol by reversed=phase high pressure liquid chromatography" Journal of Chromatography A, vol. 1246, Mar. 22, 2012 (Mar. 22, 2012), pp. 117-122 [retrieved on Mar. 22, 2012].

G. Lapienis et al. "Preparation of Monomethyl Ethers of Poly(ethylene glycol)s Free of Poly(Ethylene Glycol)" Journal of Bioactive and Compatible Polymers, US, vol. 16, No. 3, May 1, 2001 (May 1, 2001), pp. 206-220.

International Search Report with regard to International Application No. PCT/EP2019/000023, dated Jul. 12, 2019.

* cited by examiner

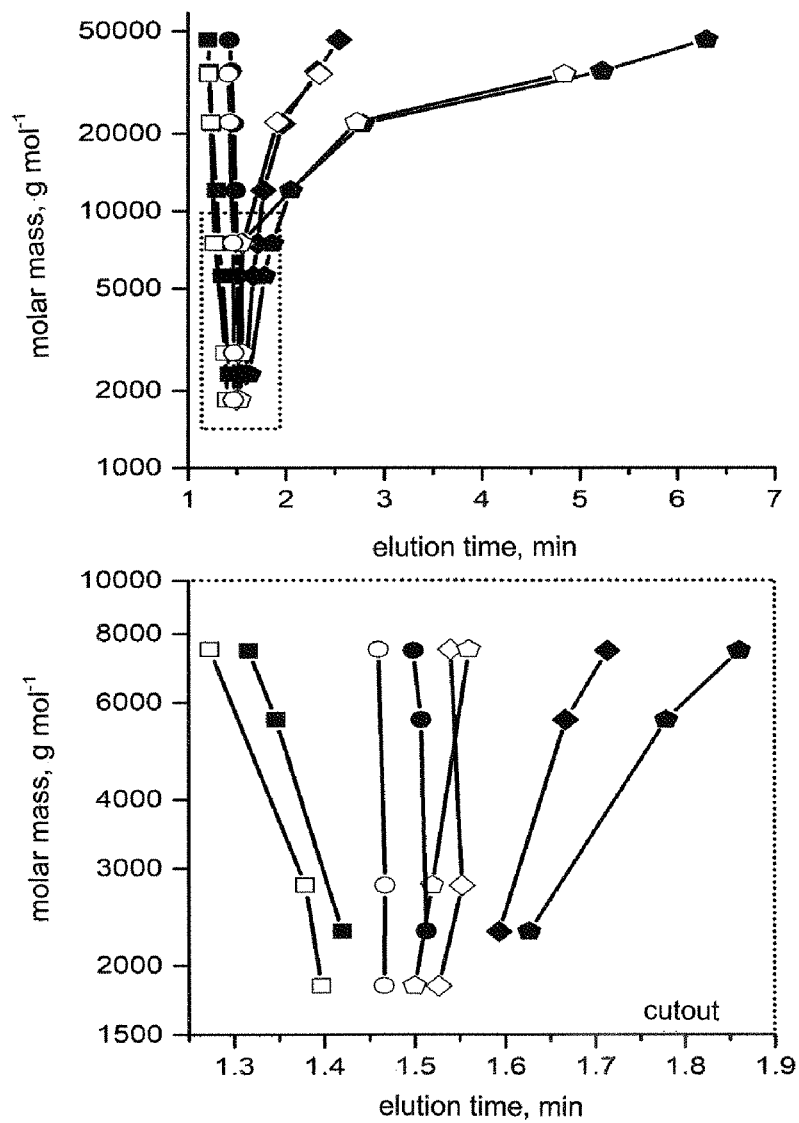
Figures 5a (top) and 5b (bottom)

METHOD FOR DETERMINING IMPURITIES IN POLYALKYLENE ETHERS OR POLYALKYLENE AMINES AND USE THEREOF

The invention relates to the determination of impurities in aliphatic polyalkylene ethers or in aliphatic polyalkylene amines, in particular the determination of polyol impurities in polyalkylene glycols or H-initiated impurities in the synthesis of polyoxazolines.

Polyalkylene glycols are used in many technical fields. Typical examples of polyalkylene glycols are polyethylene glycols (PEG). Depending on the chain length, these are liquid or solid, water-soluble and non-toxic polymers with the general formula $C_{2n}H_{4n+2}O_{n+1}$. Because of their properties, these are used in many applications, for example as active ingredient carriers in pharmacy, as a component of cosmetic products, in various industrial applications or in cell biology research.

Another example of polyalkylene glycols are polypropylene glycols. These are, for example, used in non-ionogenic detergents and cleaning agents, in synthetic resins, as antifreeze, as a flotation agent or as a chemical intermediate.

Polyalkylene amines are used, among other things, as a curing agents for epoxy resins, for the production of polyamides and as cationic flocculants. Polyalkylene amines can be converted by reaction with phosgene at the primary amino groups into the corresponding polyisocyanates, which can be used, for example, for the production of polyurethanes.

Polyalkylene glycols often contain polyol impurities and polyalkylene amines, such as polyoxazolines, often contain H-initiated species, which are determined by the synthesis pathway. These impurities are undesirable in some applications.

One of the most important pharmaceutically relevant polymers is the well-established polyethylene glycol monomethyl ether (mPEG), which has also been approved by the Federal Drug Administration (FDA) for a number of applications. A known problem of highest importance is the existence of PEG-diol impurities (PEG-diols), which can lead to the crosslinking of proteins or of other pharmaceutical components of interest and thus to complications.

Polyoxazolines are potentially of interest as substitutes or as a replenishment respectively for mPEG. There is therefore a need for a simple method of identifying and removing undesirable components.

PEG-diols and mPEG have very similar physico-chemical properties (see FIGS. 1a and 1b) and therefore PEG-diol impurities are difficult to identify.

Chromatographic methods are generally suitable for the analytical determination of impurities and for the preparative reprocessing of polyalkylene glycols or of polyalkylene amines.

Various chromatographic methods are available for the separation or purification of polymers by means of chromatographic processes. These include in particular size exclusion chromatography (SEC), chromatography under critical conditions (LCCC) and liquid adsorption chromatography (LAC).

LCCC as an elution mode can offer an elution that is independent of the chain length of the macromolecule, i.e. which is determined only by the end group. Basically, however, the influence of the alpha-methoxy end in mPEG, in contrast to the hydroxyl group in unmodified PEG, implies only very limited differences in the hydrophilic/hydrophobic properties of the PEG macromolecules (cf. FIGS. 1a and 1b), which makes simple identification methods based on liquid chromatography a challenging and as yet unresolved undertaking.

So far, there is no overall approach that allows easy identification of PEG-diol impurities in mPEG with an extensive range of molar masses. In principle, there are possibilities of chromatographic methods. These are always models that are used in very limited areas of molar masses, e.g. molar masses of well below 1000 g mol$^{-1}$ or of individual molecular masses. The patent literature on this topic suggests that identification is possible by modifying the terminal hydroxyl groups at the chain ends with groups of pronounced hydrophobic character, which result in functional omega chain ends or in functional alpha and omega chain ends, which show an interaction with the specially selected chromatography sorbent. The effectiveness of such labelling reactions is also a problem to be taken into account.

Previous determinations of impurities in polyalkylene glycols or in polyalkylene amines thus leave much to be desired in some respects. Such determinations include, for example, the analytical detection of impurities by means of SEC combined with an appropriate detection method. This method of analysis may optionally be coupled with other analytical methods, for example with magnetic resonance spectroscopy or with mass spectrometry.

Monolithic moulds have proven to be a stationary phase in the purification and separation of biopolymers. EP 1 629 887 A1, WO 2006/013043 A1, DE 198 01 575 A1 and DE 197 26 151 A1 describe such methods.

The production of monolithic or particulate sorbents with uniform pore size is described in DE 102 58 491 A1.

DE 197 26 164 A1 discloses coated monolithic sorbents.

WO 2005/075976 A2 describes a separation method in which a capillary separation method was coupled with mass spectrometry. The method is preferably carried out using a monolithic sorbent.

A chromatographic method has now been found which is excellently suited for the determination of polyol and polyamine impurities in polyalkylene glycols and polyalkylene amines. With the method of the invention polyol or polyamine impurities in commercial products can easily be determined. The method can also be operated with polyalkylene glycols or with polyalkylene amines, whose end groups have been fully or partially functionalized, or which contain functionalized polyol or polyamine impurities, for example, etherated hydroxy end groups or alkylated amino end groups. The method of the invention also allows quantitative determination of very small amounts of polyol or polyamine impurities, for example, of amounts of less than 1 wt. % of these.

With the method of the invention the amount of impurities in polyalkylene glycols or in polyalkylene amines can be determined quantitatively. Impurities having a lower molecular weight or a larger molecular weight as the desired product can be determined and/or separated. Impurities having the same molecular weight as the desired product may also be determined and/or separated, provided that the molecular mass does not take on too large values, for example values of more than 20000 g/mol.

BRIEF DESCRIPTION OF THE DRAWINGS:

Embodiments are illustrated by way of example and are not limited in the accompanying figures.

FIGS. 5a and 5b include graphs illustrating elution times of samples containing PEG-diols with different molecular weights (open symbols) and mPEG with different molecular weight (closed symbols) using varying acetonitrile/water (%, v/v) as elution agent according to embodiments.

Figures 1A, 1B:
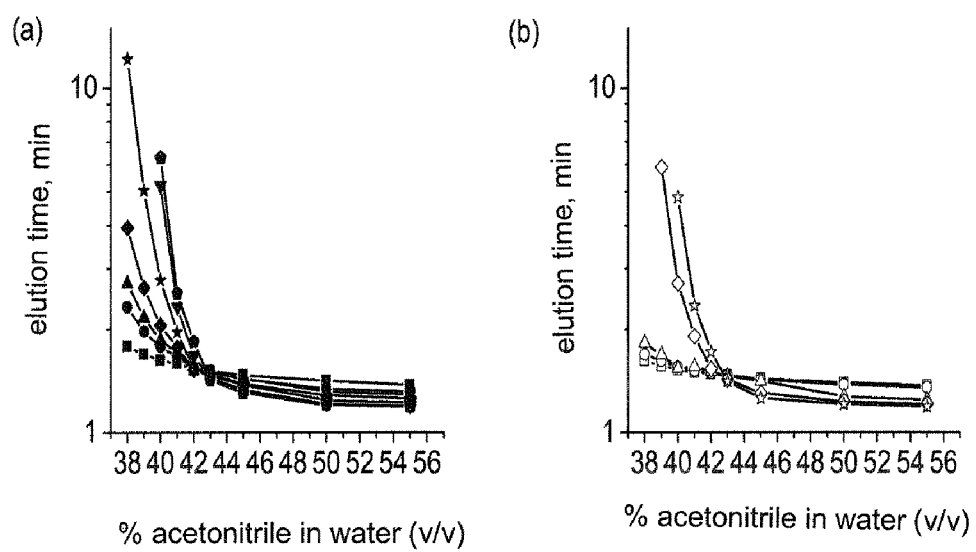
FIG. 1a includes a graph illustrating the elution time of mPEG samples with different molecular weights, using as eluent mixtures of acetonitrile with water according to embodiments.
FIG. 1b includes a graph illustrating the elution time of PEG-diol samples with different molecular weight, using as eluent mixtures of acetonitrile with water according to embodiments.

Within certain limits of dispersity, which is a prerequisite for the application of the polymers, an identification and quantitative determination of impurities is possible. The identity of impurities, such as the diol, can be supported by MALDI-MS measurements.

The invention relates to a method for the determination of impurities in polyalkylene ethers and polyalkylene amines comprising the steps i) introducing polyalkylene ethers or polyalkylene amines as an analyte into a chromatography column containing monolithic silica gel as a stationary phase,
ii) eluting the analyte with a liquid elution agent having such a polarity that the analyte is in adsorptive equilibrium with the stationary phase during chromatography,
iii) detecting the components of the analyte at the exit-side end of the chromatography column, receiving a chromatogram, which shows different components of the analyte and their qualitative amount depending on the elution time of the individual components, and
iv) identifying bands in the chromatogram having a low height or area compared to the band with the largest height or area as an indication of the presence of impurities in the analyte.

The polyalkylene glycols used according to the invention are polyvalent alcohols or the corresponding derivatives partially or completely etherified or esterified at the end groups. In these hydroxyl groups preferably form the end groups of the polymer chains.

Examples of polyalkylene glycols used according to the invention are polyethylene glycols, polypropylene glycols or polytetrahydrofurans. Examples include:

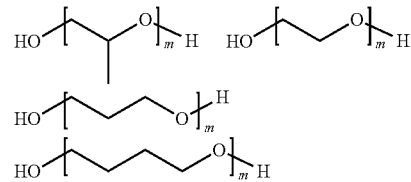

with m≥1. Furthermore, branched polyalkylene glycols with several branches, for example with 3, 4, 6 or 8 branches are possible.

Other preferably used polyalkylene glycols are those in which some or all hydroxyl end groups are etherified, in particular represent alkyl ether groups or especially methoxy groups.

Particularly preferred polyethylene glycols are used in the molar mass range of 1000 to 50000 g*mol$^{-1}$ and in particular those with typical pharmaceutically relevant molecular mass range of 1000 to 20000 g*mol$^{-1}$. The molar mass is determined for the purposes of this description by size exclusion chromatography.

The polyalkylene amines used according to the invention are multivalent amines or the corresponding derivatives which have been partially or completely functionalized at the amino groups, in particular alkylated derivatives. In these amino groups preferably form the end groups of the polymer chains. Polyalkylene amines may also have other end groups, such as hydroxy groups, alkyl groups or aromatic groups. Polyalkylene amines may have different end groups.

Examples of polyalkylene amines used according to the invention are polyethylene amines, polypropylene amines or polybutylene amines. Examples of these are polyamines with the recurrent structural units of the formula —$C_nH_{2n}$—$NR^1$—, wherein n is an integer from 2 to 4 and $R^1$ is hydrogen or $C_1$-$C_6$-alkyl, in particular hydrogen or methyl. The end groups of these polyalkylene amines are preferably residues of the formula —$NR^2R^3$, in which $R^2$ and $R^3$ independently of one another are hydrogen or $C_1$-$C_6$-alkyl, in particular hydrogen or methyl.

Poly(2-oxazolines) are preferably used. These contain in particular at 2-position a substituent, for example methyl or ethyl.

The poly (oxazoline)s used according to the invention usually contain at least 80 wt.-%, in particular at least 90 wt.-%, based on their total mass, of recurrent structural units of formula I and/or of formula II

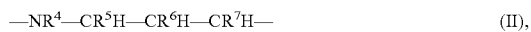

wherein
$R^4$ is a residue of the formula —CO—$R^8$,
$R^5$, $R^6$ and $R^7$ independently or one another are hydrogen, methyl, ethyl, propyl or butyl,
$R^8$ is selected from the group consisting of hydrogen, methyl, ethyl, —$C_mH_{2m}$—X or —($C_nH_{2n}$—O)$_o$—($C_pH_{2p}$—O)$_q$—$R^9$,
$R^9$ is hydrogen or $C_1$-$C_6$aAlkyl, in particular methyl or most preferably hydrogen,
m is an integer from 1 to 6,
X is selected from the group consisting of hydroxyl, alkoxy, amino, N-alkylamino, N,N-dialkylamino, carboxyl, carboxylic ester, sulfonyl, sulfonic acid ester or carbamate,
n and p are independently of one another are integers of 2 to 4, wherein n is unequal p, n is preferably 2 and p is preferably 3, and
and q independently or one another are integers from 0 to 60, in particular 1 to 20 and most preferably 2 to 10, wherein at least one of o or q is not 0.

Preferred poly(oxazoline)s used according to the invention are those in which $R^8$ is hydrogen, methyl or ethyl and $R^5$ to $R^7$ are hydrogen or in which $R^8$ is hydrogen, methyl or ethyl and two of the residues $R^5$ to $R^7$ are hydrogen and one of the residues $R^5$ to $R^7$ is methyl or ethyl.

The molar masses of the poly (oxazoline)s used according to the invention usually account for 5000 to 500000 g/mol, in particular 5000 to 20000 g/mol. The molar mass is determined for the purposes of this description by size exclusion chromatography.

Methods are preferred in which the polyalkylene ether is a polyethylene glycol or a polypropylene glycol having hydroxyl end groups which are partially or completely etherated.

Also preferred are methods in which the polyalkylene ether is a polyethylene glycol or a polypropylene glycol containing alkoxy end groups, in particular methoxy end groups.

In addition, methods are preferred in which the polyalkylene amine is an aliphatic polyoxazoline having amino end groups that may be partially or completely alkylated.

The impurities to be analyzed or separated from the polyalkylene glycols may generally be organic compounds, such as protic organic compounds, whose protic groups may be fully or partially functionalized. Typical impurities are polyols, such as monovalent alcohols or diols, whose hydroxyl groups may be partially or completely etherified, for example, are present as alkoxy groups, in particular as methoxy groups.

The impurities to be analyzed or separated from the polyalkylene amines may also be organic compounds in general, such as protic organic compounds, whose protic groups may be fully or partially functionalized. Typical impurities are polyamines, such as monovalent amines or diamines, whose amino groups may be partially or completely functionalized, for example, are present as alkylamino groups, in particular as N-alkylamino groups or as N,N-dialkylamino groups.

Polyoxazolines can be separated into individual components using a gradient method by means of liquid chromatography coupled with electrospray ionization.

The amount of impurities in the original sample is usually less than 20 wt. %, preferably less than 5 wt. % and in particular less than 1 wt. %, based on the total quantity of the original sample.

Preferred are methods in which the impurities in the polyalkylene ethers are polyols, whose mean molar mass is in the same range or below the mean molar mass of the polyalkylene ethers to be analyzed, preferably alkylene diols and/or di- or trialkylene glycols.

Also preferred are methods in which the impurities in the polyalkylene amines are polyamines, whose mean molar mass is in the same range or below the mean molar mass of the polyalkylene amines to be analyzed, preferably alkylene diamines and/or di- or trialkyleneamine diamines.

In detail, the method according to the invention is characterized by the establishment of chromatographic conditions, which account for the beginning of the adsorption regime. Under these conditions, endgroup-specific adsorption behavior begins. In the chromatography of polymers, one differentiates between three modi operandi, the size exclusion chromatography, the elution independent of the chain length and the partition or adsorption chromatography, in which an interaction of the eluent with the stationary phase takes place. The method of the invention is characterized by the presence of conditions in which an adsorption chromatography is existent.

With the present invention, the inherent problem of a defined approach of the problem of analysis of protic and/or hydroxyl-group-containing impurities is solved. The method of the invention thus offers the possibility to carry out a qualitative and also a quantitative determination of impurities in a defined molecular mass range. In particular, it is possible to go without chemical modifications of the product and to be able to carry out an analysis within a few minutes.

In addition, advantages of the method according to the invention result from the obvious simplicity of determination and from the rapidly present result, which can be obtained, for example, within a few minutes.

In addition, quantitative and reproducible purity analyses from preparation to preparation can be performed within a few minutes by rapid liquid chromatography.

As a stationary phase, a monolithic silica gel is used in the method of the invention. Such products are known and are already used in other chromatographic processes.

The highly porous silica-based monolithic materials used according to the invention are characterized by a macroporous and interconnected flow pore structure, which is enclosed by a continuous and permanent mesopore skeleton. Such stationary phases prove to be highly efficient and show a retention-stable performance when separating small analytes.

Preferably used monolithic silica gels are characterized by the presence of a communicating network of pores, i.e. by the convective and/or diffuse accessibility of the eluent to these pores. Preferred sizes of the convectively accessible pores for the eluent range from 0.2 to 3 μm. In addition, the monolithic silica gels can still have pores, which are accessible to the eluent by diffusion. The size of these pores preferably ranges from 3 to 200 nm.

Preferred monolithic silica gels are modified with functional groups on the surface including the inner surface.

These may be hydrophilic groups or hydrophobic groups. Examples of hydrophilic groups are hydroxyl groups. Examples of hydrophobic groups are alkyl groups, for example alkyl groups with 4, 8, 12 or 18 carbon atoms.

Alternatively, the monolithic silica gel can be used in an unmodified form, i.e. as a polar material.

The monolithic silica gel can therefore be used as a polar material or also in hydrophobic form, i.e. as an unpolar material.

Preferably, monolithic silica gel rods are used which have been derivatized with long alkyl groups, e.g. with $C_{18}$-alkyl.

In the method of the invention an eluent with such polarity is used that the analyte during chromatography is in adsorptive equilibrium with the stationary phase. The adjustment of the elution strength can be carried out, for example, by mixing solvents of different polarity. In this case, such an elution strength is set, in which the chromatography takes place as adsorption/partition chromatography. The setting can be carried out by the skilled person by dilution series by means of simple series tests.

When using polar monolithic silica gel, eluents with low polarity are considered. Examples of these are nonpolar solvents, which are preferably anhydrous. Aliphatic or aromatic hydrocarbons liquid at 25° C. are preferred as eluents, such as hexane, heptane, octane, decane, benzene, toluene or xylene, as well as halogenated aliphatic hydrocarbons liquid at 25° C., such as dichloromethane, chloroform or tetrachloromethane, or carboxylic acid esters liquid at 25° C., such as acetic acid methyl ester or acetic acid ethyl ester, or ethers liquid at 25° C., such as diethylether, or carbon disulfide. These eluents can also be used as mixtures to adjust the required elution strength.

Nonpolar solvents can be mixed with small amounts of water, alcohols or aprotic polar solvents to adjust a certain polarity of the elution agent.

When using nonpolar monolithic silica gel (corresponding to a stationary phase formed as a reversal phase), eluents with high polarity are considered.

Examples of polar eluents are water, water-soluble alcohols or aprotic polar solvents.

Examples of water-soluble alcohols are aliphatic alcohols with one to four carbon atoms.

Examples of aprotic polar solvents are ketones, such as acetone, lactones, such as gamma-butyrolactone, lactames, such as N-methyl-2-pyrrolidone, nitriles, such as acetonitrile, nitro compounds, such as nitromethane, tertiary carboxylic acid amides, such as dimethyl formamide or dimethyl acetamide, urea derivatives, such as tetramethyl urea or dimethylpropylene urea (DMPU), sulfoxides, such as dimethyl sulfoxide (DMSO), sulfones, such as sulfolane, carbonic esters, such as dimethyl carbonate or ethylene carbonate.

Particularly preferred mixtures of water with aprotic polar solvents are used. Examples of these are mixtures of methanol and water, of ethanol and water or of acetone and water, or in particular mixtures of water with acetonitrile.

The required polarity of the elution agent according to a volume ratio of water to aprotic polar solvent, such as water to acetonitrile, of 6:4 is an excellent initial value. The fine-tuning of the separation parameters is carried out by the series tests mentioned above in infinitesimal steps. For the system water/acetonitrile the volume ratio of 6.5:3.5 to 5.5:4.5 is preferably sought.

Preferred is a method in which the monolithic silica gel is formed as a reversed phase and in which the eluent contains water and an organic solvent in such a quantity that the elution of the analyte is carried out as adsorption/partition chromatography.

The method of the invention can be carried out at normal pressure or preferably at overpressure. Preferably, the pressure in the chromatography column is 10 to 200 bar.

The method according to the invention is carried out at such temperatures in which the eluent is liquid in the column. Preferably, the temperature in the chromatography column is 4 to 50° C.

Column lengths and column diameters can be selected in wide ranges. Typical column lengths range from 1 cm to 1 m. Typical column diameters range from 10 μm to 10 cm.

The detection of the components of the analyte at the exit-side end of the chromatography column can be carried out by all methods known to the skilled person. Examples of these are the detection of physical properties of the mobile phase, such as light absorption, fluorescence, light scattering or thermal conductivity, or the detection of chemical properties of the mobile phase, such as the use of indicator substances.

Preferred are methods in which the detection of the components of the analyte at the exit-side end of the chromatography column is carried out by light scattering detection (ELSD) or by UV/VIS spectroscopy.

The result of the detection of the components of the analyte at the exit-side end of the chromatography column is a chromatogram in which species of the sample with different elution times are plotted depending on time.

The qualitative quantity of a respective component can be determined from the height or area of the bands of the chromatogram. Quantitative determinations can also be carried out by using appropriate calibration standards.

Impurities in a sample are contained only to a small content in it compared to the polymers, which make up the main part of the sample.

When bands appear in the chromatogram with a low height or area compared to the band with the largest height or area, it can be concluded that impurities are present in the sample.

Preferred is a method in which the height of the bands with low height is less than 10%, in particular less than 5% of the height of the bands with the highest height. In the case of PEG-diol, for example, it is possible to detect up to a band height of 0.8% of the height of the band with the highest height.

The method according to the invention can be carried out batchwise or continuously. Standard appatures of chromatography can be used for this purpose, for example conventional HPLC systems, which are equipped with the special column material.

The method of the invention is suitable for the rapid testing of polyalkylene glycols or polyalkylene amines for impurities. It can therefore be advantageously used for quality control of such products.

The method of the invention can also be used for the separation of impurities from polyalkylene glycols or from polyalkylene amines. It can therefore also be advantageously used in the preparative purification of these compounds.

These uses are also the subject of the present invention.

The following examples explain the invention without limiting it.

EXAMPLES

A chromatography system (Agilent Technologies 1200 Series, Polymer Standards Service GmbH (PSS, Mainz))

was used to perform chromatographic measurements. The system consisted of a column furnace and a light scattering detector (ELSD), which was operated with nitrogen as a carrier gas. Measurements were performed on commercially available polyethylene glycol diols (PEG-diols; PSS, Mainz, Germany and PL, Shropshire, UK) and on synthesized polyethylene glycol monomethyl ethers (mPEG). A high-resolution chromolite column was used (monolithic silica gel with RP-18 end group capped). The chromolite column was obtained from Merck KGaA (Darmstadt, Germany). The length of the column was 100 mm and its inner diameter was 4.6 mm. The column material had a high porosity of more than 80% and had macropores of about 1.1 µm in size and mesopores of about 15 nm. The inner surface of the column material was 250 m$^2$ g$^{-1}$. The inner surface was determined by mercury porosimetry or by nitrogen adsorption/-desorption isotherms.

Molar masses (numerical means $M_n$ and weight means $M_w$) of the synthesized mPEG samples were determined by size exclusion chromatography and showed narrow dispersities (Đ≥1,1). Details are found in Table 1 below.

TABLE 1

Overview of the properties of polyethylene glycol diols (PEG) and polyethylene glycol monomethyl ethers (mPEG)

| product | $M_n$ (g mol$^{-1}$) | $M_w$ (g mol$^{-1}$) | Đ |
| --- | --- | --- | --- |
| PEG 1 | 375 | 400 | 1.07 |
| PEG 2 | 1840 | 2010 | 1.09 |
| PEG 3 | 2800 | 3060 | 1.09 |
| PEG 4 | 7500 | 11200 | 1.51 |
| PEG 5 | 22100 | 25800 | 1.17 |
| PEG 6 | 34000 | 42700 | 1.26 |
| mPEG 1 | 2300 | 2400 | 1.04 |
| mPEG 2 | 5600 | 5800 | 1.04 |
| mPEG 3 | 7500 | 7700 | 1.03 |
| mPEG 4 | 120000 | 13200 | 1.10 |
| mPEG 5 | 21800 | 22700 | 1.04 |
| mPEG 6 | 34900 | 37200 | 1.07 |
| mPEG 7 | 46200 | 50100 | 1.08 |

Chemicals and Materials

The reagents and solvents used were commercially available products purchased from Aldrich or Linde. Ethylene oxide (EO) was stirred in burettes over sodium before distillation. Before their use, 2-methoxyethanol and diphenylmethane were stirred over calcium hydride and then distilled under vacuum. The cleaned reactants were rinsed with argon, stored in Schlenk tubes in a glove box and used within three days. Tetrahydrofuran was dried by heating under reflux over freshly prepared sodium benzophenone until a deep blue color appeared. The dried tetrahydrofuran was subsequently stored in a Schlenk tube under inert gas and used within a short time.

Acetonitrile of HPLC grade was acquired from Sigma (Taufkirchen, Germany) and ultra-pure water was freshly prepared in a Thermo Scientific™ Barnstaedt™ GenPure™-xCAD water purification system (Thermo Electron LED GmbH, Langenselbold, Germany). The methoxy polyethylene glycol samples used (mPEG samples) were synthesized. The PEG samples were purchased as SEC standards from PSS (Polymer Standards Service GmbH, Mainz, Germany) and PL (Polymer Laboratories, Shropshire, United Kingdom).

Manufacture of mPEG Samples

The production of the initiator potassium-2-methoxy ethanolate took place under inert conditions. 2-Methoxyethanol was dissolved in tetrahydrofuran and diphenylmethyl potassium was added drop by drop until a precipitation of the product could be observed and a slight orange mixture was formed. The product was washed four times with tetrahydrofuran until the orange color had completely disappeared. The product was then dried under vacuum and accumulated as a grey powder.

The preparation of the initiator solutions for the polymerization of EO to mPEG by living anionic ring opening polymerization (AROP) was carried out with the exclusion of water and air (inert). First, tetrahydrofuran and potassium-2-methoxy ethanolate were added to a GL45 bottle under inert conditions. In order to be able to carry out the entire process under inert conditions, the fine suspension was then transferred via PTFE hoses to a PicoClave glass autoclave reactor (BüchiGlasUster, Uster, Switzerland) and cooled to −20° C. by stirring. Subsequently, the corresponding amount of EO was added to the reaction mixture using a mini-CORI-FLOW mass flow control apparatus (Bronkhorst High-Tech B. B., Ruurlo, Netherlands), whereby subsequently was heated to 45° C. within 120 min and was stirred for a further 48 hours. By adding a mixture of ethanol/acetic acid (95/5%, v/v) the polymerization was aborted. For insulation and cleaning, the polymer was filtered in cold diethyl ether and dried under vacuum. The product accumulated as a white powder.

Determination of the Molecular Weight of the Synthesized mPEG Samples

Size exclusion chromatographic measurements (SEC) were performed on a Shimadzu SEC system (control unit: CBM-20A VP, degasser: DGU-20A5, pump: LC-10ADVP, automatic sampler: SIL-10AD VP, furnace: TechLab, RI detector: RID-10A), which was operated with a ternary mobile phase consisting of chloroform/-isopropanol/triethylamine (94/2/4%, v/v/v) as an eluent. The PS5 SDV linear S column (5 micron particle size) was operated with a volume flow of 1 mL min$^{-1}$ at a temperature of 40° C. The system was calibrated in the range of 194 g mol$^{-1}$ to 106000 g mol$^{-1}$ using a PEG/PEO standard established by (i) Polymer Standards Service GmbH (PSS, Mainz, Germany) (PEO 106000, 55800, 42700, 26100 g mol$^{-1}$) and (ii) Polymer Laboratories (PL, Shropshire, UK) (PEG 12600, 7100, 4100, 1470, 960, 600, 440, 194 g mol$^{-1}$).

Liquid Chromatography

Chromatographic measurements were carried out with a modified system of the Agilent Technologies 1200 series from PSS (Polymer Standards Service GmbH, Mainz). Dead volumes of the column were reduced by using 130 µm ID hose, which ran from the injector to the column head and from the column outlet to the detector. The injection volume was set to 10 µl in all experiments, i.e. 0.6% of the column volume. The column was housed in a TCC 6000 column furnace from PSS (Polymer Standards Service GmbH, Mainz) and was tempered at 30° C. A light scattering detector (ELSD) (Softa Model 400) from PSS (Polymer Standards Service GmbH, Mainz) was connected to the outlet line of the column. Nitrogen was used as carrier gas for the ELSD detector. The temperature of the chamber and the drift pipe was set to 45 and 70° C. respectively. The detector was operated at the maximum data rate of 10 Hz. Elutions were performed on a high-resolution chromolite column (monolithic silica gel with RP-18 end group capped). The chromolite column was obtained by Merck KGaA (Darmstadt, Germany). The column length was 100 mm with a diameter of 4.6 mm. The total dead volume of the system was determined by replacing the column with a hose connector with a dead volume of zero and injecting the smallest and largest PEG sample. It was calculated that the dead volume was about 2% of the total column volume.

All samples were provided in concentrations between 0.1 and 2.0 mg mL$^{-1}$ by dissolving them in the respective mobile phase used for the chromatography experiments. Prior to the analysis, samples were filtered using a PTFE filter with a pore size of 0.45 μm.

Experiments of Matrix-Assisted Laser-Desorption-Ionization Flight Time Mass Spectroscopy (MALDI-TOF-MS)

MALDI-TOF-MS experiments were carried out on the collected elution fractions using an UltraFlex TOF/TOF mass spectrometer (Bruker Daltonics, Bremen, Germany), which was equipped with an Nd-YAG laser. All spectra were recorded in positive reflector mode. Before each measurement the instrument was calibrated with an external PMMA standard from PSS (Polymer Standards Services GmbH, Mainz) in the required mass measuring range. MS data was analyzed with Flex Analysis 3.4 software and isotope patterns were generated using a software (Isotope Pattern Calculator by Bruker Daltonics). For the sample preparation of the MALDI-MS samples, the collected elution fractions, a solution of trans-2-[3-(4-tert.-butylphenyl)-2-methyl-2-propenylidene]malonic acid dinitrile (DCTB, Sigma-Aldrich) in chloroform at a concentration of 30 mg mL$^{-1}$ and the doping salt sodium iodide dissolved in chloroform at a concentration of 60 mg mL$^{-1}$ were used. The elution fraction with the sample was first placed on the sample plate and the sample was then allowed to dry. After drying, the solutions of the matrix and the salt were applied to the appropriate place on the sample plate. For each sample, 0.5 μl of the sample solution was used, followed by 0.5 μl of the matrix-salt mixture solutions.

Example 1: Determination of Elution Times Depending on the Composition of the Eluent FIGS. 1 a) and 1 b) show elution times for different mPEG samples (closed symbols) and PEG diol samples (open symbols) depending on the composition of the eluent. Mixtures of acetonitrile with water were used as eluent.

FIG. 1 a) shows the results for mPEG samples with different molecular weights ($M_n$=2300 g/mol; $M_n$=5600 g/mol; $M_n$=7500 g/mol; $M_n$=12000 g/mol; $M_n$21800 g/mol; $M_n$=34900 g/mol; $M_n$=46200 g/mol).

FIG. 1b) shows the results for PEG-diol samples with different molecular weights ($M_n$=1840 g/mol; $M_n$=2800 g/mol; $M_n$=7500 g/mol; $M_n$=22100 g/mol; $M_n$=34000 g/mol).

Figure 2:
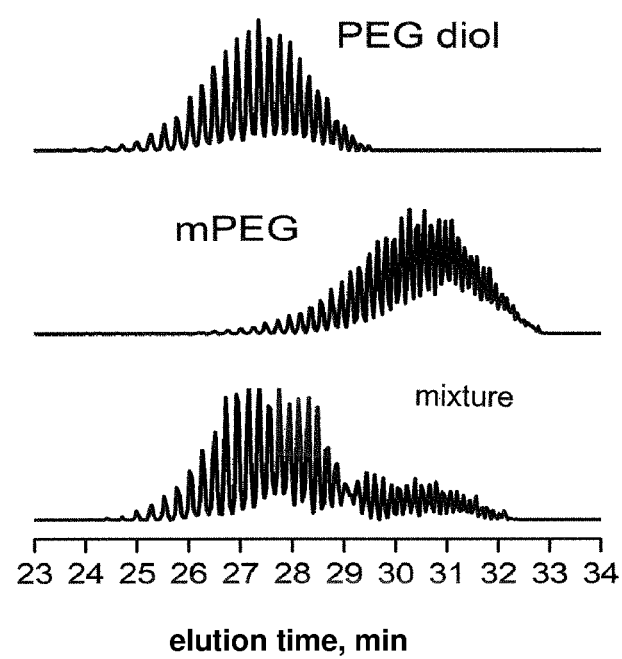
FIG. 2 includes a graph illustrating the gradient elutions of a PEG-diol sample (upper curve), a mPEG sample (middle curve), and a mixture of the PEG-diol sample and the mPEG sample (lower curve) according to embodiments.

FIG. 2 shows results of the gradient elution of a PEG-diol sample, a mPEG sample and a mixture of both samples. The upper curve shows the elution of a PEG-diol sample with an average molecular weight $M_n$=1840 g/mol. The middle curve shows the elution of an mPEG sample with an average molecular mass $M_n$=2300 g/mol and the lower curve shows the elution of a 50/50 (%, v/v) mixture of these two samples.

Conditions: Binary composition of the mobile phase with 10% acetonitrile in water which was kept isocratic for 3 minutes and then increased linearly within 50 minutes to a content of 50% acetonitrile in water (%, v/v)

Figure 3:
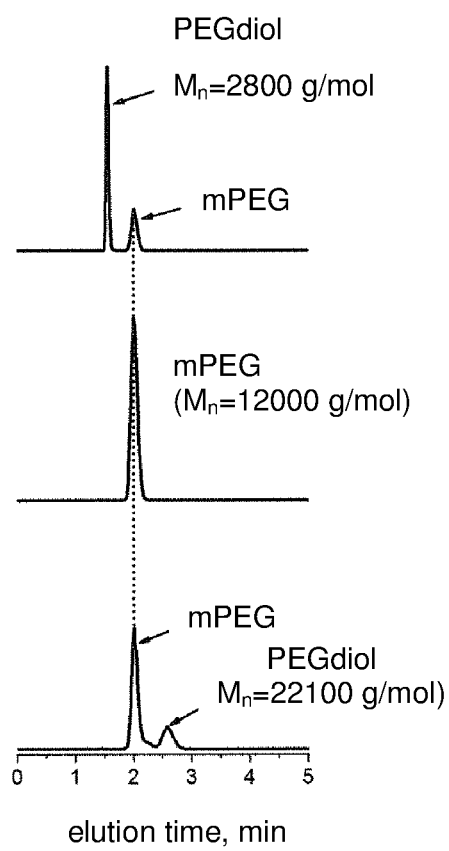
FIG. 3 includes a graph illustrating three elugrams wherein mPEG samples with the molecular weight of 12000 g/mol are used in combination with a lower-molecular weight PEGdiol (upper elugram), the mPEG sample is used as single ingredient (middle elugram), and the mPEG sample is used in combination with a higher molecular weight PEG-diol (lower elugram).

FIG. 3 shows the elugrams of a mPEG sample of the mean molar weight of $M_n$12 000 g/mol (middle curve) and of 50/50 (%, v/v) mixtures of this mPEG sample with PEG-diol of the mean molar weight $M_n$=2800 g/mol (upper curve) or with PEG-diol of the mean molecular weight $M_n$=22100 g/mol (lower curve). The composition of the mobile phase of water/acetonitrile was 60/40 (%, v/v). The flow rate of the mobile phase was 1 mL/min.

Figure 4A:
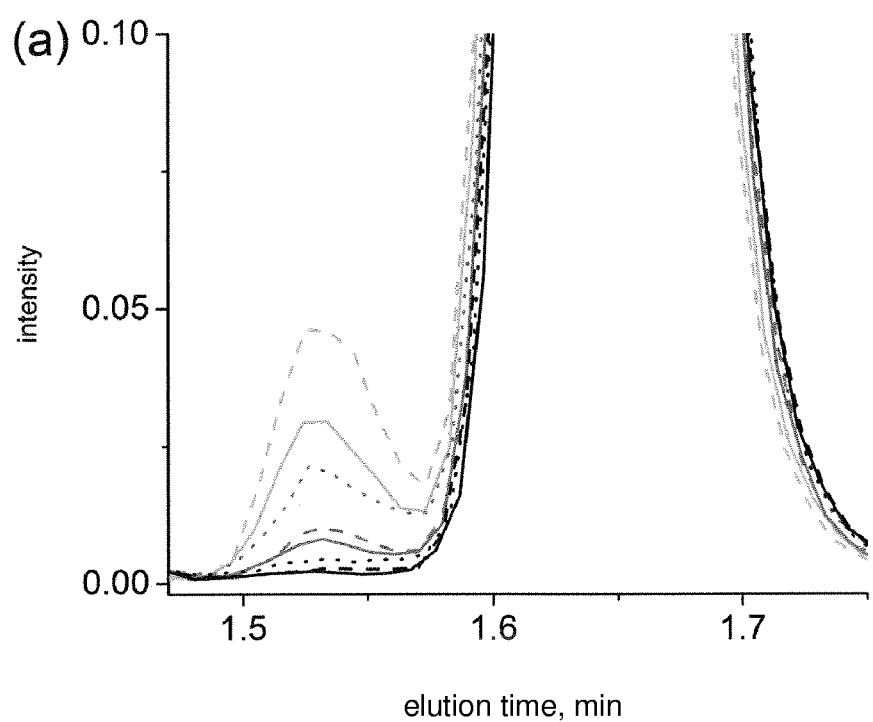
FIG. 4a includes a graph illustrating elugrams of mixtures of constant m-PEG content with different levels of PEG-diol according to embodiments.

FIG. 4(a) shows the elugrams of mixtures of m-PEG with different levels of PEG-diol. The content of mPEG of the mean molecular weight of $M_n$=2300 g/mol was kept constant at 1 mg/mL and increasing levels of PEG-diol of the mean molecular weight of $M_n$=1840 g/mol were used.

Figure 4B:
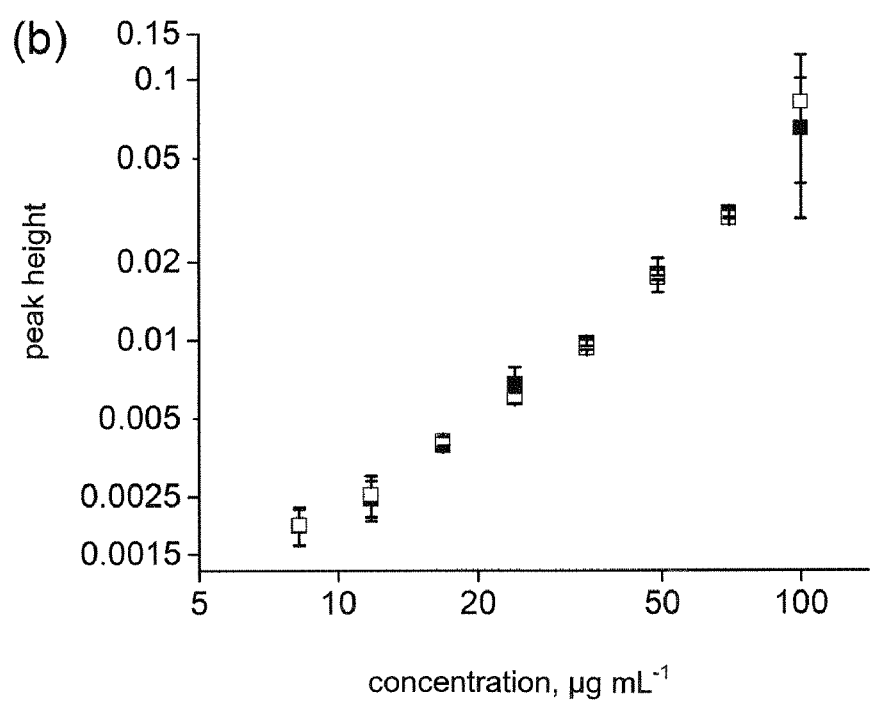
FIG. 4b includes a graph illustrating a double-logarithmic plot of the band heights of the PEG-diol in the elugrams of in FIG. 4a in relation to the content of the PEG-diol according to embodiments.

FIG. 4(b) shows a double-logarithmic plot of the band height of the elution signal in relation to the content of PEG-diol in the mixture (with error bars obtained from a three times repeated injection and chromatographic analysis). The measurements were repeated the next day with the same samples (open symbols).

FIGS. 5a and 5b show the results of elution of mPEG and PEG-diols. The mean molar masses $M_n$ of the mPEG and PEG-diols used range from 1500 to 50000 g/mol. The upper figure shows results obtained using 50/50 to 40/60 acetonitrile/-water (%, v/v) as an eluent. The lower figure shows a clearly enlarged section of FIG. 5a.

In the upper FIG. 5a, the molar masses ($M_n$) of PEG-diols (open symbols) and mPEG (closed symbols) are plotted against the elution time at 50/50 acetonitrile/-water (%, v/v), indicating the transition between size exclusion mode (squares) and adsorption/partition mode (diamonds and pentagons). The latter is first achieved for the larger molar masses. The lower diagram 5b with a lower concentration of acetonitrile as elution agent shows that at the content of 40% acetonitrile in the elution agent, the mPEG with a lower molar mass elute significantly later than the PEG-diols. The composition of the mobile phase was 40/60 acetonitrile/water (%, v/v). The flow rate of the mobile phase for both FIGS. 5a and 5b was 1 mL min$^{-1}$.

FIGS. 5a and 5b show that a composition of the mobile phase of 50/50 acetonitrile/-water (%, v/v) leads to elution patterns that are influenced by size exclusion effects, i.e. the largest mPEG and PEG-diols elute first. Increase in the polarity of the elution agent of the mobile phase to 42% acetonitrile shows increased elution times for the PEG with larger molar masses, so that all PEG eluate at similar elution times, with virtually no selectivity (circles) over all molar masses. These results demonstrate the limited ability of liquid chromatography under critical conditions (LCCC elution mode) to differentiate between mPEG and PEG-diol, since the difference between alpha-hydroxyl compared to alpha-methoxy is simply too small to allow clear critical adsorption conditions based on the end group character (FIG. 1).

In the case of eluents containing only 40 to 41% acetonitrile, larger PEG eluate significantly later than the smaller, i.e. at molar masses of more than 10000 g mol$^{-1}$ (diamonds and pentagons in FIG. 5a) the partition/adsorption of the polymer scaffold is entered, i.e. at molecular weights above 10000 g mol$^{-1}$, the partition/adsorption mode is clearly occurring (diamonds and pentagons in the upper part of FIG. 5a). Above 10000 g mol$^{-1}$, the result is determined exclusively by the molar mass dependent adsorption/partition of the polymer scaffold with a gradually decreasing contribution, which derives from the identity of the alpha groups. This is shown in the lower part of FIG. 5a, which relates to the smaller molecular weights (×10000 g mol$^{-1}$, pentagons).

At this point, partition and adsorption begin to dominate the elution. It should also be noted that small but noticeable differences in the elution time are beginning to develop in the elution times for the populations of the species of mPEG and the PEG-diols. FIGS. 5a and 5b thus describe a unique possibility of separating mPEG and PEG-diol species with very similar molecular weights, i.e. separation in partition/adsorption mode at an acetonitrile content of 40%. While PEG-diols between 1000 and 10000 g mol$^{-1}$ still elute quite similarly, mPEG show a delayed elution (pentagons in FIGS. 5a and 5b). This is demonstrated, for example, below on separations of mixtures of a mPEG/PEG-diol pair with similar molar masses (FIG. 6a).

Figures 6A, 6B:
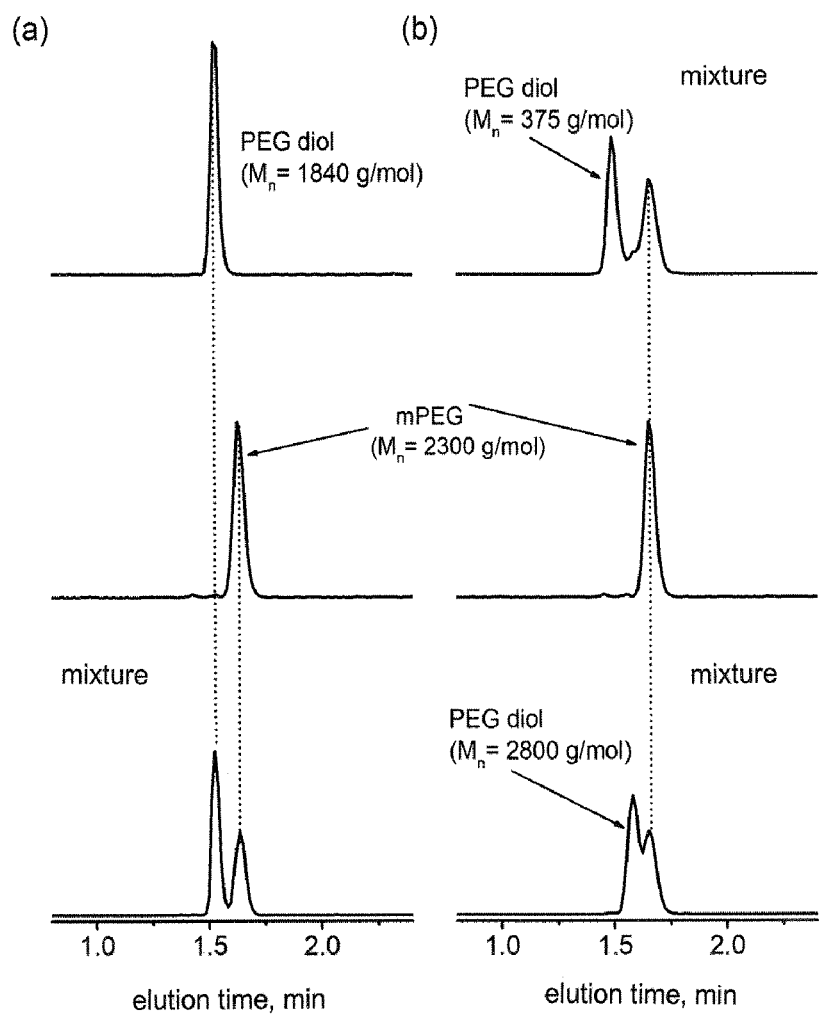
FIG. 6a includes a graph illustrating elugrams of PEG-diol having a molecular weight of Mn=1840 g/mol (upper track) and mPEG of $M_n$=2300 g/mol (middle track), and mixtures of both (lower track) according to embodiments.
FIG. 6b includes a graph illustrating elugrams of mPEG having a molecular weight of Mn 2300 g/mol (middle track), a mixture of this mPEG with a PEG-diol having a molecular weight of Mn=375 g/mol (upper track), and a mixture of this mPEG with a PEG-diol having a molecular weight of 2800 g/mol (lower track) according to embodiments.

FIG. 6a shows elugrams of PEG-diol ($M_n$=1840 g mol$^{-1}$, upper track), mPEG ($M_n$=2300 g mol$^{-1}$, middle track) and their mixture of 50/50 (%, v/v) (lower track).

FIG. 6b shows elugrams of mPEG ($M_n$=2300 g mol$^{-1}$, medium track), mixtures of this m-PEG with PEG-diol ($M_n$=375 g mol$^{-1}$, upper track) and mixtures of this m-PEG with PEG-diol ($M_n$=2800 g mol$^{-1}$, lower track).

In the experiments shown in FIGS. 6a and 6b, the flow velocity of the mobile phase was 1 mL min$^{-1}$ and the mobile phase had a composition of 60/40 water/acetonitrile (%, v/v).

These results show that the mPEG of the example of FIG. 6a elutes as a narrow band that is different from that of a PEG-diol with a similar molar mass. Larger mPEG with molar masses of 20000 g mol$^{-1}$ elute similarly to model diols with comparable molar mass (FIG. 1). This situation is not surprising and originates from a lost selectivity with respect to the end group character at molar masses greater than 20000 g mol$^{-1}$, wherein the adsorption of the polymer chain strongly dominates the elution.

It is noted that when using a diol with significantly different molar mass and molar mass distribution, separation of mPEG and PEG-diol is possible even with larger molar masses.

To support the pronounced selectivity between mPEG and PEG-diol, the mPEG used in FIGS. 6a and 6b was analyzed using gradient-liquid chromatography (FIG. 2). The experiments showed the expected dispersity of the PEG standards and the mPEG samples due to the appearance of a variety of bands in both the PEG-diol and the mPEG sample. Gradient elution does not improve the discriminability between mPEG and PEG-diol (FIG. 2).

As a result of different initiation scenarios and reaction kinetics as well as the execution of polymerization, it is unlikely that PEG-diol impurities have the same molar masses values as the mPEG samples. The different initiation probabilities and kinetics of the growing polymer chains with two possible connecting points for monomers need attention. It is therefore a detection desirable whether smaller and in particular larger amounts of PEG-diol impurities are present in mPEG products. In order to imitate such conditions, mPEG samples were examined containing a controlled content of PEG-diol with lower or larger molar mass at the lower and upper end of the molar mass range. Selected elugrams are shown in FIGS. 6b and 3.

It is clear that diols with lower molar mass differ significantly from the respective mPEG (FIGS. 6b and 3, top traces), but are increasingly difficult to identify with larger molar mass of the diol (FIGS. 6b and 3, lowest trace), although two species can be identified in the elugrams. The example of the PEG-diol with the larger molar mass (FIG. 3, lowest track) elutes in two distinct fractions that come from a bimodal distribution of the molar masses. However, these elute later than the mPEG fraction. This is an inherent result of the elution of the PEG-diols, which is based on the adsorption/partition of the polymer chains of the macromolecules with greater molar mass (FIG. 5). The smaller elution fraction also shows some overlap with the fraction of the mPEG. Notwithstanding and in contrast to the pure mPEG (FIGS. 6a and 6b, middle track), the PEG-diol is displayed by a clear elution pattern as shown in the chromatograms (FIG. S3, lowest track compared to the middle track).

To illustrate the fundamental suitability of the method for estimating a quantity of existing PEG-diols, experiments were carried out with mixtures of different concentrations of PEG-diol ($M_n$=1840 g mol$^{-1}$) with a fixed concentration of mPEG ($M_n$=2300 g mol$^{-1}$) (FIG. 4a).

Although the typical nonlinear dependence of the ELSD is obvious even in the double logarithmic plot of the band height against the concentration of the solution (FIG. 4), the repeatability of the measurements on different days allows an estimation of the concentrations and the content of PEG-diols of less than 1% at a fixed concentration of mPEG 1 mg mL$^{-1}$ (FIG. 4).

To demonstrate the performance of the method of the approach described here, a sample of mPEG was analyzed, which had been produced in the presence of a protic contamination, e.g. of water. The water had been added at the beginning of the living anionic ring opening polymerization. In this case, diol contamination is indicated by a clear shoulder in the band in the chromatogram (FIG. 7a).

Figures 7A, 7B:
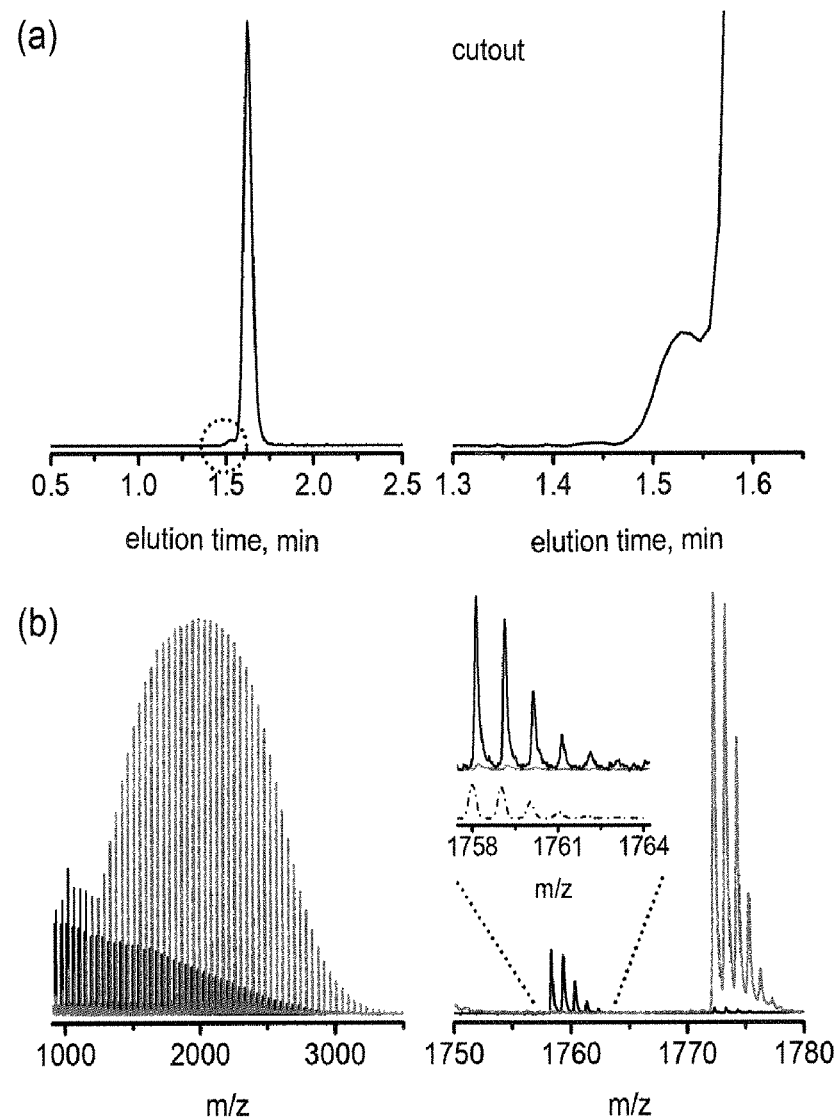
FIG. 7a includes a graph illustrating an elugram of a mPEG sample from an anionic polymerization containing potential diol contamination (PEG-diol) and a respective cutout according to one embodiment.
FIG. 7b includes a graph illustrating on the left side MALDI-TOF-MS spectra of the PEG-diol (in black) and of the mPEG (in gray) of FIG. 7a; on the right side are excerpts from the mass spectra with an isotope fragmentation pattern of the PEG-diol and the mPEG, and the calculated isotope fragmentation pattern for PEG diols (dashed line) according to one embodiment.

FIG. 7a shows an application example for the described method. The same chromatographic conditions as described in FIG. 6 were used.

FIG. 7a shows the elution trace of 1 mg mL$^{-1}$ of a product of anionic polymerization containing diol contamination. The representation on the right side of FIG. 7a is an enlargement of the band on the left side of this figure.

FIG. 7b shows in the left half MALDI-TOF-MS spectra of the collected small elution fractions identified as PEG-diol (shown in black) and the larger elution fraction identified as mPEG (shown in gray). The right half of FIG. 7b the isotope fragmentation pattern of the PEG-diol and the mPEG is shown. An excerpt from the mass spectrum is displayed, where the dashed line is the calculated isotope fragmentation pattern for PEG-diols.

The elution fraction collected from the chromatogram (FIG. 7a) was identified by using MALDI-TOF-MS as PEG-diol contamination with a wide molar mass distribution of less than 1000 m/z up to 3000 m/z (FIG. 7b, left part, black mass spectrum). The amount of PEG-diol was estimated at about 8%.

From the data of these examples it can be inferred that under experimental conditions, which do not lead to a selective elution of species based on a distribution of the molar mass (e.g. FIG. 3), but the populations of mPEG and PEG-diols occur in fairly narrow elution bands (e.g. FIG. 3), a rapid identification of PEG-diol impurities in mPEG in the pharmaceutical-relevant molar range is possible.

Figure 8:
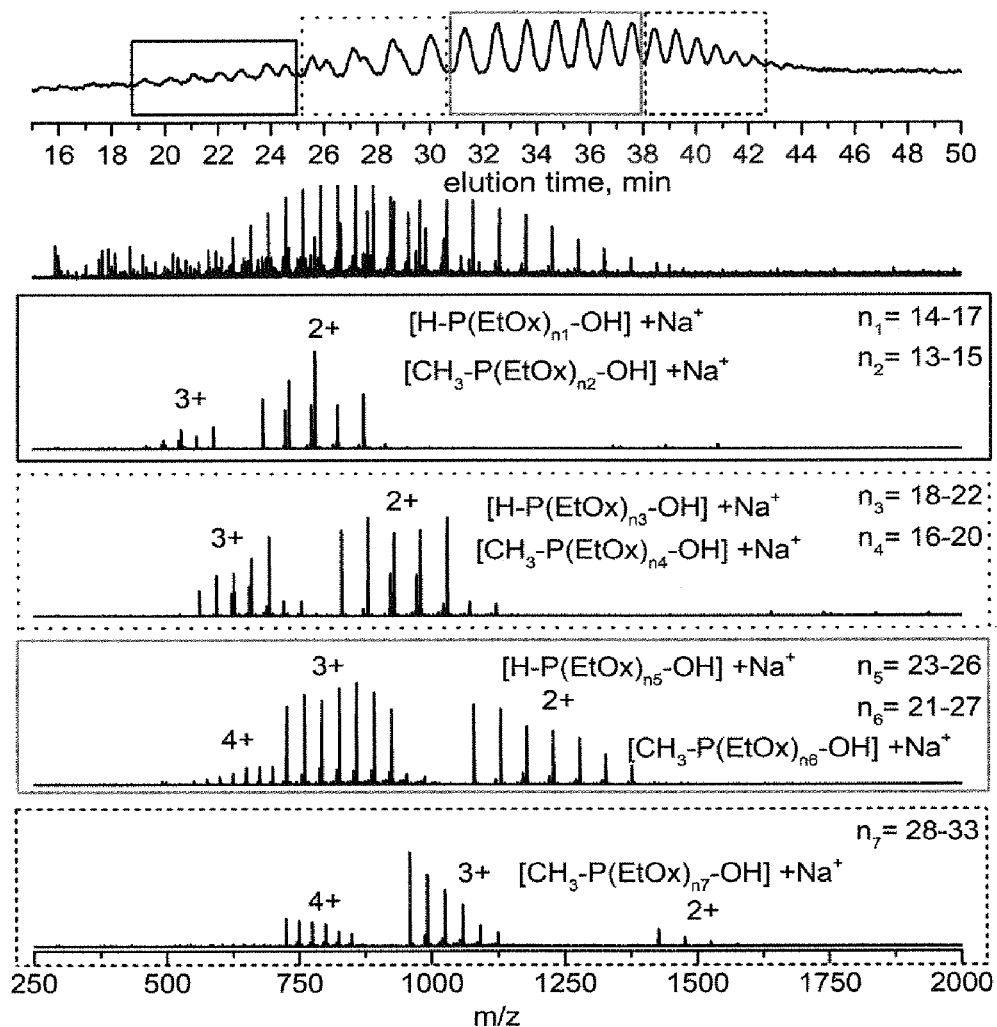
FIG. 8 includes a graph illustrating an elugram with corresponding mass spectra obtained after conducting gradient liquid chromatography with electrospray ionization (ESI) of different oligomers of polyoxazolines according to one embodiment.

Using gradient liquid chromatography coupled with electrospray ionization (ESI), polyoxazolines were investigated (FIG. 8). FIG. 8 shows the individual oligomers in the chromatogram of polyoxazoline, which has a OH and a $CH_3$ end group. Under the chromatogram, the ESI spectrum of the substance to be examined is shown. The individual oligomers examined in mass spectroscopy are framed. These elute at different times, which is represented in the chromatogram by the respective frames. Mass spectroscopically, $CH_3$— and H-initiated polyoxazolines could be detected and chromatographically separated using a gradient method. The measurement was carried out with a flow of 0.5 mL/min with aqueous acetonitrile as an eluent. The acetonitrile content was increased from 20% to 40% within 70 min. After a further 10 min, the acetonitrile content was increased to 80%. A chromatography column was used, which contained monolithic silica gel as a stationary phase.

The invention claimed is:

1. A method for determining impurities in a polyalkylene ether or a polyalkylene amine consisting essentially of:

i) introducing an analyte comprising the polyalkylene ether or the polyalkylene amine into a chromatography column containing monolithic silica gel as a stationary phase, wherein the monolithic silica gel is a porous monolithic material comprising interconnected macropores and mesopores, ii) eluting the analyte with a liquid elution agent having a polarity that the analyte is in adsorptive equilibrium with the stationary phase during chromatography, iii) detecting individual components of the analyte at an exit-side end of the chromatography column containing monolithic silica gel, and receiving a chromatogram, the chromatogram showing individual components of the analyte depending on an elution time of the individual components, wherein the individual components are individual polyalkylene ethers or individual polyalkylene amines, and iv) identifying and quantifying impurities in the chromatogram by band height or area comparison, wherein bands having a low height or area correspond to polyalkylene ether impurities or polyalkylene amine impurities in the analyte in comparison to a band with a largest height or area.

2. The method according to claim 1, characterized in that the polyalkylene ether comprises a polyethylene glycol, or a polypropylene glycol, or a combination thereof.

3. The method according to claim 2, wherein the polyethylene glycol or the polypropylene glycol include alkoxy end groups.

4. The method according to claim 1, characterized in that the polyalkylene amine comprises an aliphatic polyoxazoline.

5. The method according to claim 1, characterized in that the impurities in the polyalkylene ether are polyols whose mean molar mass is in a same range or below a mean molar mass of the polyalkylene ether to be analyzed, the impurities including alkylene diols and/or di- or trialkylene glycols.

6. The method according to claim 1, characterized in that the impurities in the polyalkylene amine are polyamines whose mean molar mass is in a same range or below a mean molar mass of the polyalkylene amine to be analyzed, the impurities including alkylene diamines and/or di- or trialkyleneimine diamines.

7. The method according to claim 1, wherein the monolithic silica gel is reversed phase, and an eluent contains water and an organic solvent in an amount that eluting of the analyte takes place as adsorption chromatography.

8. The method according to claim 7, characterized in that the eluent contains water and acetonitrile.

9. The method according to claim 1, characterized in that the method includes high-pressure liquid chromatography.

10. The method according to claim 1, characterized in that a detection of the components of the analyte at the exit-side end of the chromatography column is carried out by light scattering detection (ELSD) or by UV/VIS spectroscopy.

11. The method according to claim 1, characterized in that the height or area of the bands with a low height or area is less than 10% of the height or area of the band with the largest height or area.

12. The method according to claim 2, wherein the polyethylene glycol or the polypropylene glycol include hydroxy end groups.

13. The method of claim 12, wherein the hydroxy end groups are partially or completely etherified.

14. The method of claim 3, wherein the polyethylene glycol or the polypropylene glycol include methoxy end groups.

15. The method of claim 4, wherein the aliphatic polyoxazoline includes end groups selected from amino groups, hydroxy groups, alkyl groups, aryl groups, or a combination thereof.

16. The method of claim 15, wherein the end groups include amino groups, and the amino groups are partially or completely alkylated.

17. The method of claim 1, wherein an amount of the impurities of the polyalkylene ether or a the polyalkylene amine is not greater than 1%.

* * * * *